United States Patent
Gandy et al.

(10) Patent No.: US 7,547,859 B2
(45) Date of Patent: Jun. 16, 2009

(54) METHOD FOR REPAIRING HEAT RECOVERY STEAM GENERATOR TUBE-TO-HEADER DAMAGE

(75) Inventors: David Wayne Gandy, Concord, NC (US); Greg Frederick, Harrisburg, NC (US); Kent Coleman, Concord, NC (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 311 days.

(21) Appl. No.: 11/364,604

(22) Filed: Feb. 28, 2006

(65) Prior Publication Data

US 2006/0207096 A1 Sep. 21, 2006

Related U.S. Application Data

(60) Provisional application No. 60/656,959, filed on Feb. 28, 2005.

(51) Int. Cl.
B23K 31/00 (2006.01)
B23K 9/28 (2006.01)
B23K 37/02 (2006.01)
B23H 9/00 (2006.01)

(52) U.S. Cl. .................. 219/61; 29/402.07; 29/890.031; 219/69.17; 219/69.2

(58) Field of Classification Search ............ 29/890.031, 29/402.07, 402.11; 219/61, 60 R, 60.2, 69.17, 219/69.2, 60 A; 376/203, 260
See application file for complete search history.

(56) References Cited

U.S. PATENT DOCUMENTS

| | | | |
|---|---|---|---|
| 4,283,615 A | | 8/1981 | Vrillon |
| 4,379,963 A | * | 4/1983 | Kazlauskas ................ 219/60 A |
| 4,406,856 A | | 9/1983 | Wilkins et al. |
| 4,615,477 A | | 10/1986 | Spada et al. |
| 4,694,549 A | * | 9/1987 | Rabe ..................... 29/890.031 |
| 4,749,117 A | * | 6/1988 | Noe et al. ................... 228/107 |
| 4,925,074 A | | 5/1990 | Wood |
| 5,044,075 A | * | 9/1991 | Brennan et al. ......... 29/890.031 |
| 5,184,391 A | | 2/1993 | Fisk et al. |
| 5,205,038 A | | 4/1993 | Archer et al. |
| 5,225,645 A | * | 7/1993 | Overbay et al. ............ 219/69.2 |
| 5,430,270 A | | 7/1995 | Findlan et al. |
| 5,514,849 A | | 5/1996 | Findlan et al. |
| 5,573,683 A | | 11/1996 | Findlan et al. |
| 5,656,185 A | | 8/1997 | Findlan et al. |

(Continued)

FOREIGN PATENT DOCUMENTS

JP 8-281468 A * 10/1996

(Continued)

*Primary Examiner*—Geoffrey S Evans
(74) *Attorney, Agent, or Firm*—Curatolo Sidoti Co., LPA; Joseph G. Curatolo; Salvatore A. Sidoti

(57) ABSTRACT

A method for repairing a heat recovery steam generator (HSRG) header to tube attachment damage, includes providing an access window in the header opposite the damaged header to tube attachment location; removing the header to tube attachment damage; inserting a tapered stub tube into a header penetration centered axially immediately over the tube; effecting a profile weld between the header and the tapered stub tube at the header penetration from the inside surface of the header; welding the tapered stub tube to the existing tube through the header inside diameter; welding shut the access window; and completing a post weld heat treatment of all the welds.

13 Claims, 12 Drawing Sheets

U.S. PATENT DOCUMENTS

| | | | |
|---|---|---|---|
| 5,816,292 A | * | 10/1998 | Wilson et al. ................. 138/89 |
| 5,977,513 A | | 11/1999 | Findlan |
| 6,211,482 B1 | | 4/2001 | Findlan et al. |
| 6,247,231 B1 | | 6/2001 | Findlan et al. |
| 6,596,957 B2 | | 7/2003 | Gandy et al. |
| 6,673,169 B1 | | 1/2004 | Peterson, Jr. et al. |
| 7,252,138 B2 | * | 8/2007 | Burkhalter et al. ..... 29/890.031 |
| 2005/0126664 A1 | | 6/2005 | Peterson, Jr. et al. |

FOREIGN PATENT DOCUMENTS

SU            673806 A   *   7/1979

* cited by examiner

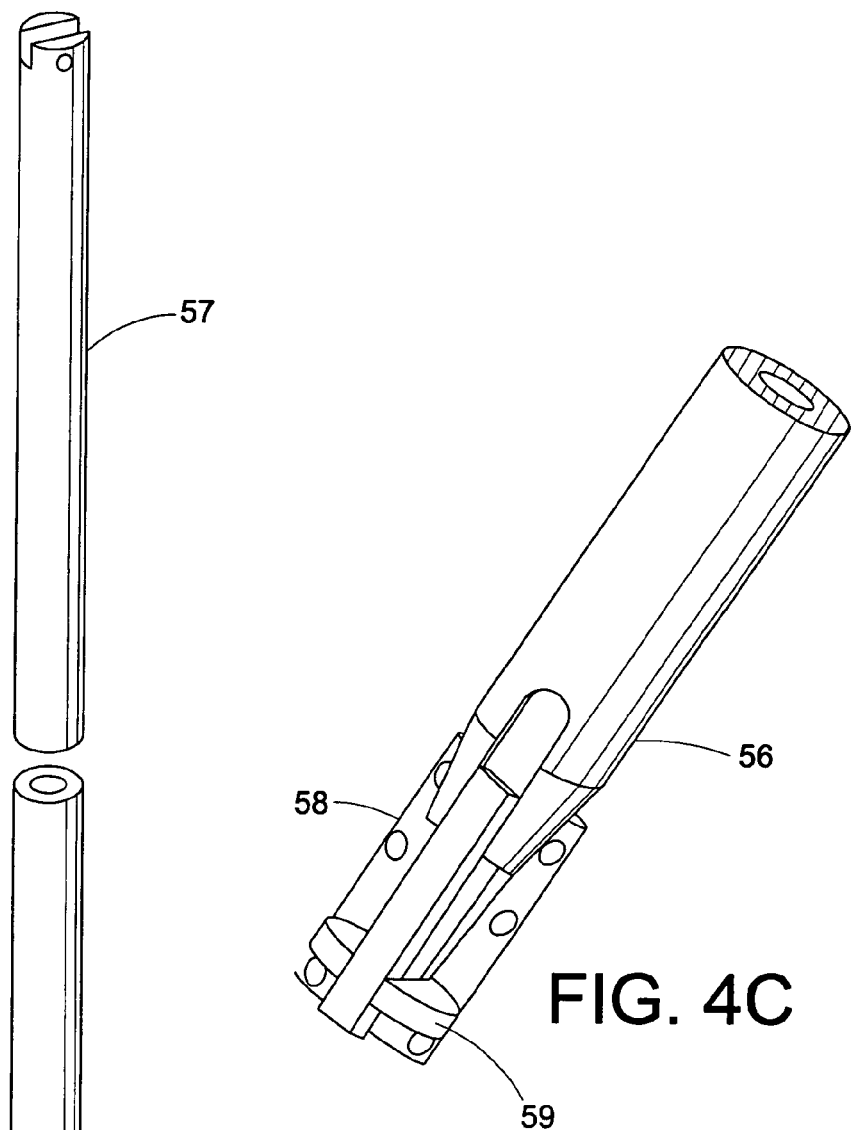
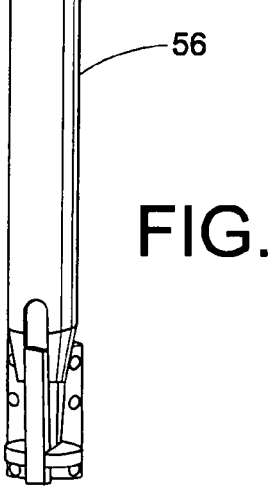
FIG. 4B
FIG. 4C

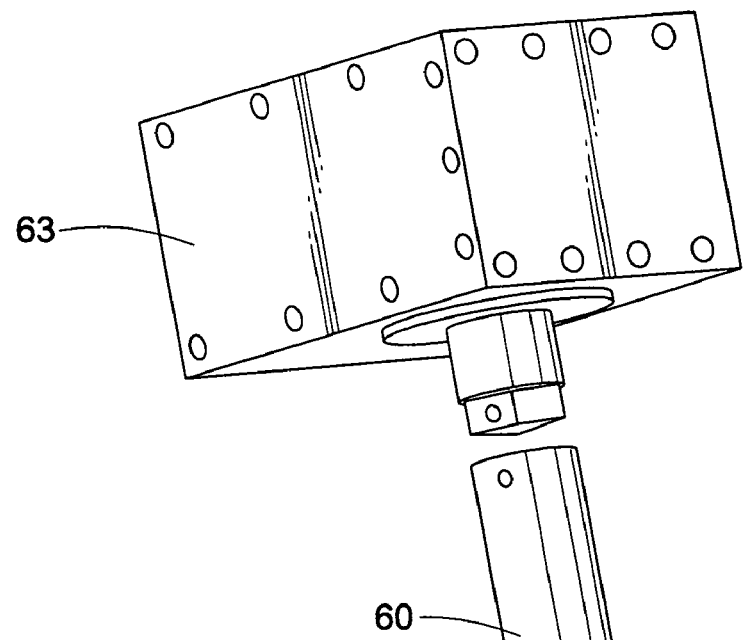
FIG. 4D
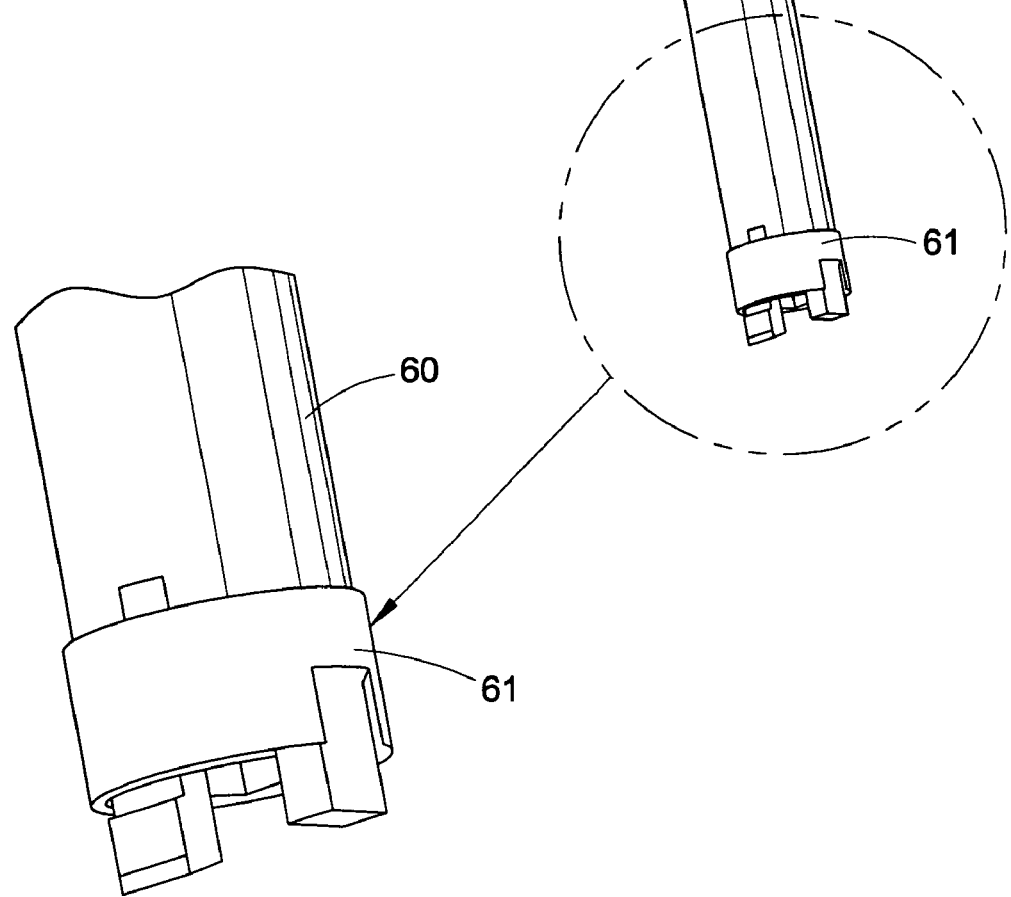

METHOD FOR REPAIRING HEAT RECOVERY STEAM GENERATOR TUBE-TO-HEADER DAMAGE

CROSS REFERENCE TO RELATED APPLICATIONS

This application claims the benefit of the filing date of U.S. Provisional Application for Patent Ser. No. 60/656,959 filed Feb. 28, 2005.

FIELD OF INVENTION

The present invention is directed to a method for repairing heat exchanger tube and tube attachment damage, such as for heat transfer applications. More specifically, the disclosed method is related to a method for repairing a heat recovery steam generator (HSRG) tube damage and tube to header attachment damage, for applications such as electricity producing power plants, such as fossil fuel plants.

BACKGROUND

One of the life limiting factors for many heat recovery steam generators (HRSGs) is associated with damage that occurs at header-to-tube attachments. This attachment is particularly troublesome due to thermal differences experienced between the header and the tubes during cyclic operation. Tubes attached to the header tend to cool very rapidly to the temperature of the incoming water and the bulk wall temperature of the header tends to respond much more slowly. Thermal shock results and often leads to thermal fatigue failures at the toe of the tube weld. Corrosion fatigue in the vicinity of the root of the toe welds have also been noted for units that experience extensive cycling.

Restricted axial expansion of tubes induces forces and bending moments on both tubes and the tube attachments. Tubes are restricted from moving as they are attached to inlet and outlet headers at each end. This results in restricted thermal expansion. Tube temperatures quickly follow the temperature of the fluid flowing through them. Anomalies in temperature and flow rate of the fluid between tubes in the same row can cause significant differences in the amperage temperatures of the set of tubes attached to the same headers. During start-ups and shutdowns, these transient conditions place abnormal stresses on the tubes and tube attachments, eventually resulting in damage to the attachments.

At present, the industry addresses tube attachment damage from the outside of the header. This requires cutting your way past a number of tubes in a tube bundle, performing the weld repair from the outside of the tube (often requiring partial tube replacement), and then re-welding all of the tubes that were cut to gain access to the header-to-tube damage. This approach (commonly referred to as "cutting your way in and welding your way out") is time consuming, costly, and more often than not, results in poor weld quality due to limited accessibility.

Commonly assigned U.S. Pat. No. 6,596,957 is directed to a method and apparatus and prefabricated replacement tube for localized waterwall repair, and is incorporated by reference as if fully written out below. Also, commonly assigned U.S. Patent Application entitled "Method for Inspection and Repair", filed on even date, is incorporated by reference as if fully written out below.

SUMMARY

Repairing HRSG header-to-tube damage from inside the header (as opposed to the outside) significantly reduces the opportunity for subsequent failures to repaired tubes and provides a more fatigue-resistant attachment design to those currently found in the industry. The method provided reduces the number of welds required as well as the time required to complete the repair.

A method is provided for repairing header to tube attachment damage comprising: providing an access window in the header opposite the attachment damage location; removing the tube damage; inserting a tapered stub tube into a header penetration centered axially immediately over the tube; effecting a profile weld between the header and the tapered stub tube at the header penetration from the inside surface of the header; welding the tapered stub tube to the existing tube through the header inside diameter; welding shut the header access window; and completing the post weld heat treatment of all the welds.

BRIEF DESCRIPTION OF THE DRAWINGS

FIG. 4B is a schematic illustration of a primary mandrel and a mandrel extension.

FIG. 4C is a schematic illustration of a mandrel gripper and a retaining ring.

FIG. 4D is a schematic illustration of a cutting shaft and cutting tooling.

DETAILED DESCRIPTION

Figure 1:
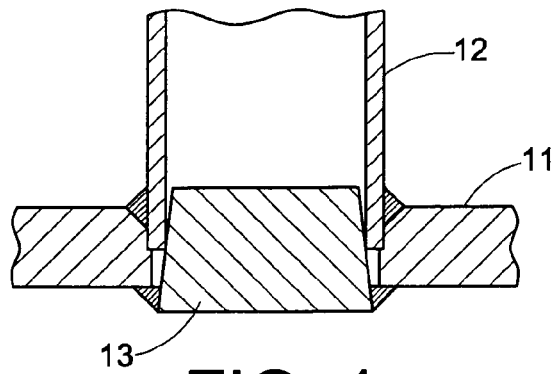
FIG. 1 is a cross-section of a plug inserted into a header to tube attachment.

The present method provides a more pragmatic approach to address HRSG header-to-tube attachment damage than is currently used by industry today. This form of repair is often more difficult than conventional tube repairs due to limited access to the damage location. As a result, tube and header to tube attachment failures are often left in place and simply plugged. FIG. 1 illustrates a plug weld configuration. Plugging requires removal of an access window within the header 11 one hundred eighty (180) degrees away from the stub tube 12 attachment location, machining and insertion of a plug 13 into the damaged tube bore, welding of the plug into place, and then re-installation of the window.

Figure 2A:
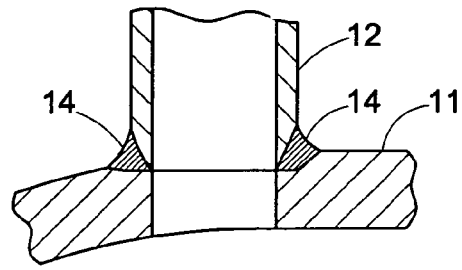
FIG. 2A is a schematic illustration of a partial penetration weld of a header to tube attachment.
Figure 2B:
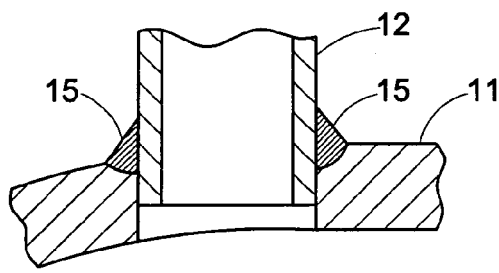
FIG. 2B is a schematic illustration of a full penetration weld of a header to tube attachment.
Figure 2C:
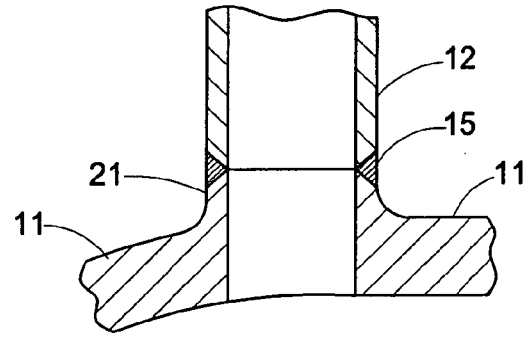
FIG. 2C is a schematic illustration of a forged integral nipple and full penetration weld of a header to tube attachment.
Figure 2D:
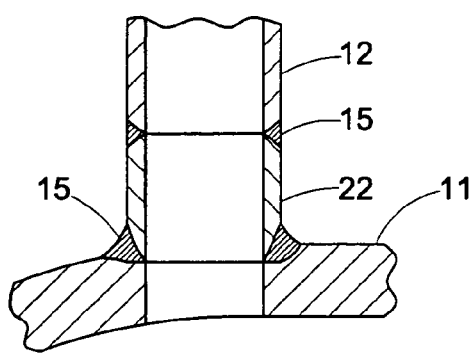
FIG. 2D is a schematic illustration of separate nipple and full penetration welds between the nipple and header to tube attachment.

Repair methodology is complicated by the number of different attachment configurations used by industry. Header to tube attachment weld designs used by original equipment manufacturers (OEMs) include:

a) partial penetration welds 14 (shown in FIG. 2A);

b) full penetration welds 15 (shown in FIG. 2B);

c) forged nipples 21 with full penetration welds 15 (shown in FIG. 2C);

d) separate nipples 22 and full penetration welds 15 between nipple 22 and header 11 and tube 12 (shown in FIG. 2D).

The present method is applicable to all four attachment configurations.

For the purposes of the present method, the phrase header to tube attachment damage also defines damage to the tube away from the attachment location. Additionally, the term tube should be interpreted as defining both tubes and pipes.

Figure 2E:
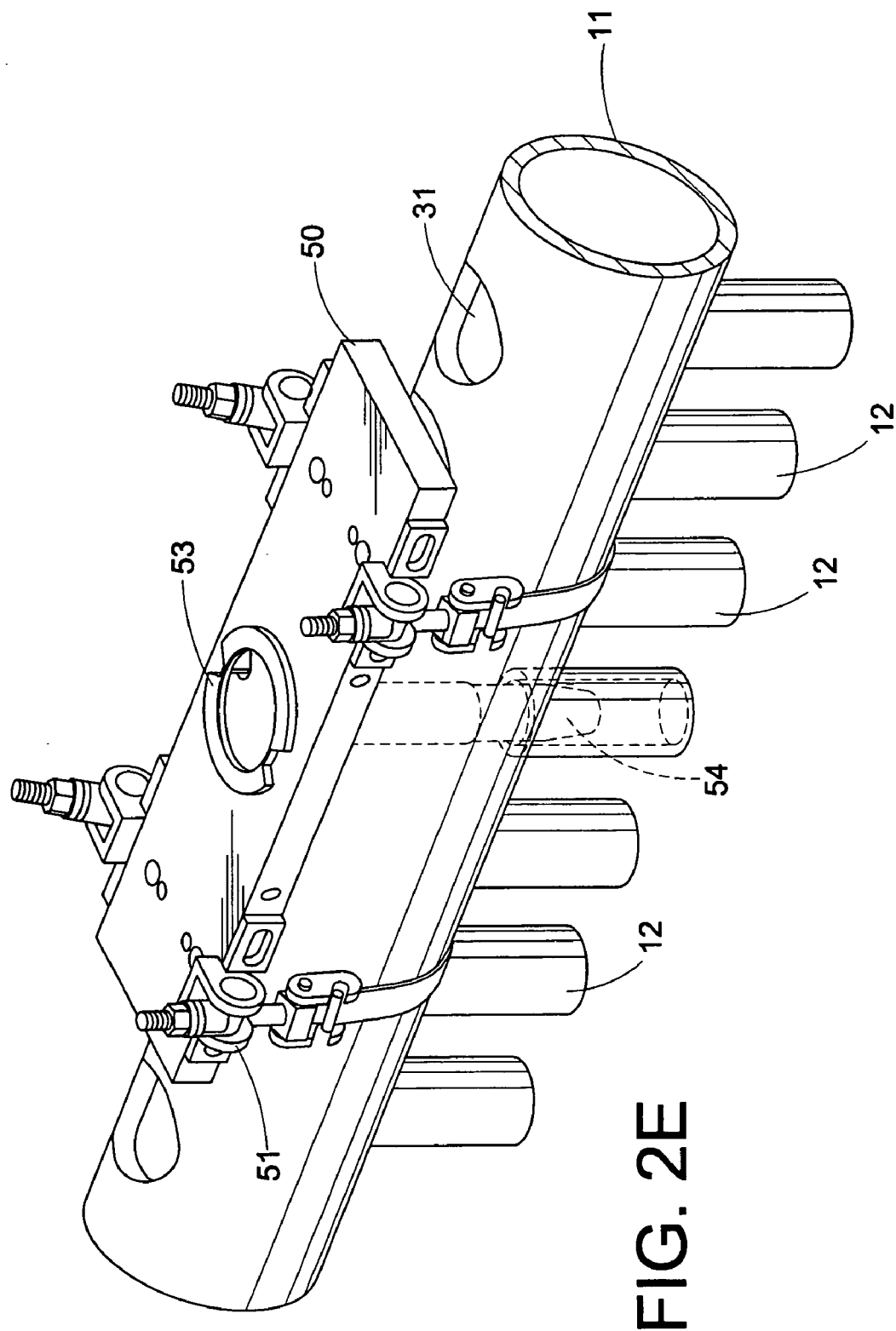
FIG. 2E is a schematic illustration of a base plate mounted to a header with an alignment ring and an alignment plug.

The present method addresses the attachment damage from the inside of the header as opposed to "cutting your way in and welding your way out." In certain embodiments, the header diameter can range from about 3 inches to about 12 inches. The attachment damage repair can be performed from either the upper or lower header. For illustrative purposes only, the following description is based on a repair from the upper header. In this approach, the first step is to create an access window in the header, about 180 degrees across from the damaged tube. The access window may be created either manually or automatically. When performed automatically, a base plate 50 is mounted on the header 11 and secured, for instance, with clamping straps 51. FIG. 2E is a schematic illustration of the base plate 50 mounted on the header 11. The base plate may serve as the platform from which all major steps can be launched. The base plate is mounted approximately 180 degrees away, and centered axially along the header from the attachment damage location.

Figure 2F:
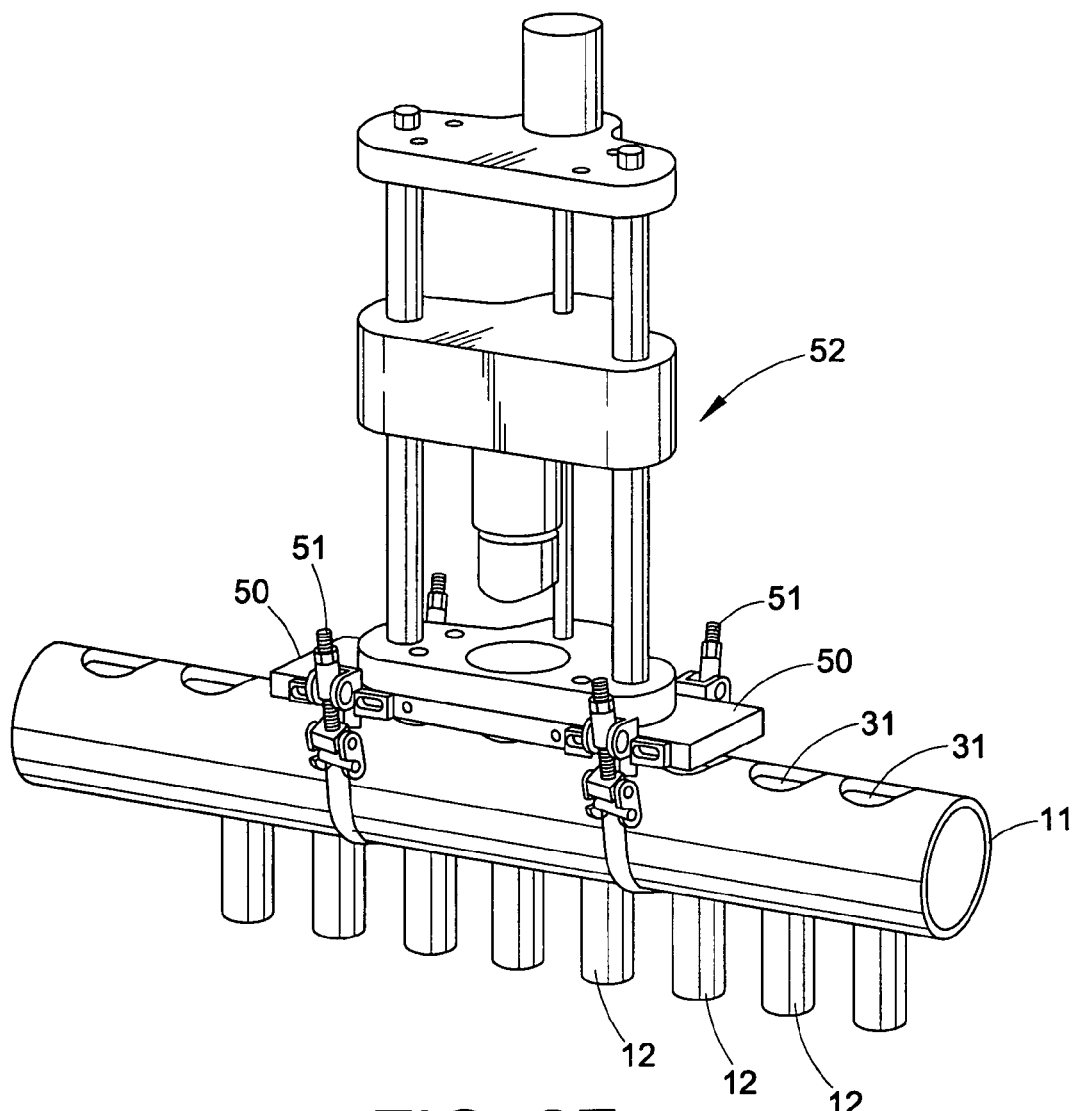
FIG. 2F is a schematic illustration of a base plate mounted to a header with an EDM assembly mounted to the base plate.
Figure 3:
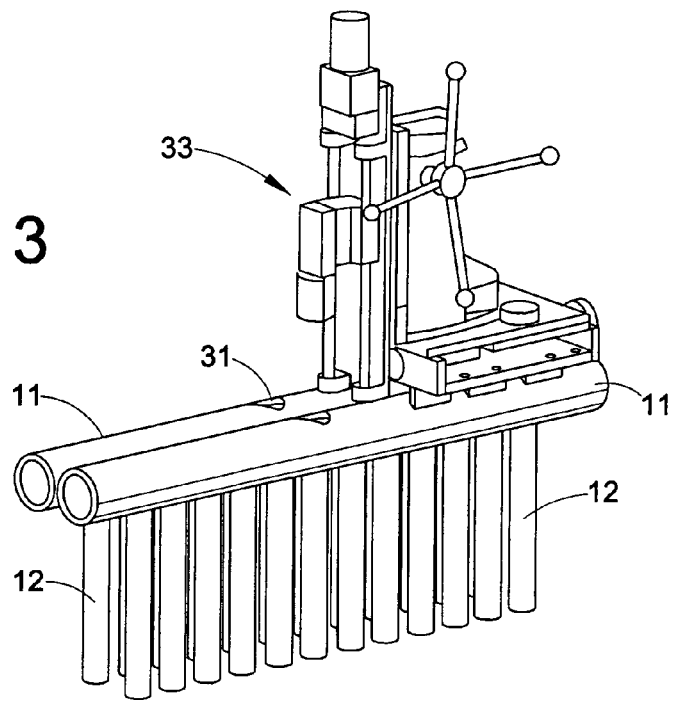
FIG. 3 is a schematic illustration of another embodiment of a repair tooling on a header to tube assembly.

In one embodiment, an electrical discharge machining (EDM) assembly 52 is mounted on the base plate 50. The EDM electrode, fabricated to match the contour and diameter of the header, is inserted into the EDM assembly. FIG. 2F is a schematic illustration of an EDM assembly 52 for providing access windows 31 into the header 11. The EDM assembly is activated to remove a plug from the header, approximately 180 degrees from the attachment damage location. The resulting hole in the header serves as the access window 31 to the inside of the header and tube. The diameter of the access window should be greater than the stub tube diameter to allow for insertion of the stub tube. FIG. 3 is a schematic illustration of tooling 33 for repair of header 11 to tube attachment damage.

Following preparation of the access window 31, the base plate may be centered exactly over the damaged tube. This can be accomplished by using an alignment ring 53 and alignment plug 54. FIG. 2E is a schematic illustration of a base plate 50 with an alignment ring 53 and alignment plug 54. First, the center alignment plug and alignment ring are mounted to the base plate 50. Next, the clamping straps 51 are loosened and the base plate adjusted until the alignment plug slips through the header 11 and into the tube 12 with the attachment damage. The base plate is then properly aligned for the remaining steps, and the clamping straps can be tightened. The alignment ring and plug are then removed.

After aligning the base plate, the attachment damage may be removed by either severing and withdrawing the damaged portion, or machining (or grinding) through the damaged area.

Figure 4A:
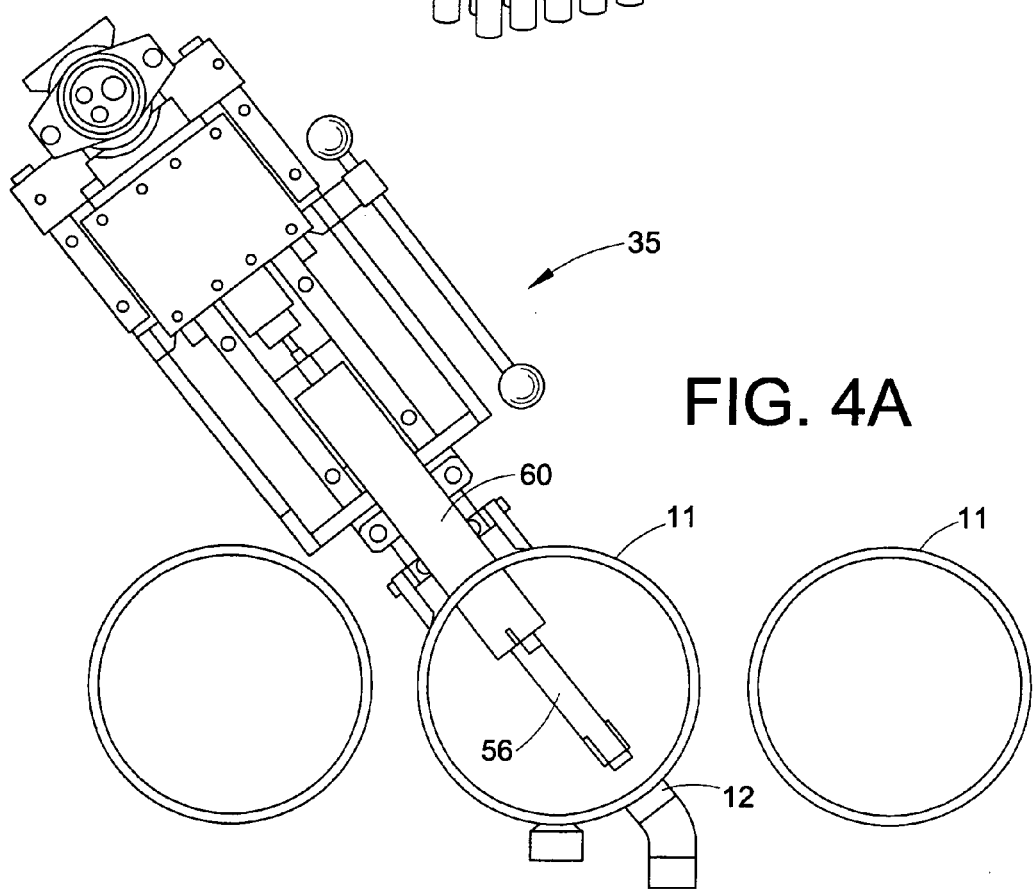
FIG. 4A is a schematic illustration of a repair device on a header, removing a tube.

To sever and withdraw the attachment damage, a tube-cutting assembly is mounted on the base plate and a cutting device is extended therefrom through the header and into the tube beyond the attachment damage. In certain embodiments, the repair may accommodate off-set tubing (often referred to as dog-leg tubing) as this is where many failures have been noted. FIG. 4A illustrates a schematic representation of a cutting assembly 35 shown on an 8-inch header 11, removing a tube 12 at a 30-degree angle.

Next, the cutting device is activated and the tube is cut proximate to the header. The cutting location is typically about 1" to 4" from the outer diameter surface of the header. However, the distance may vary depending on the location of the damage. As a result, the damaged portion including the attachment damage and a small part of the tube only remain connected to the header. Next, the damaged portion is severed from the header, such as by boring or EDM. The diameter of the resulting header penetration should be at least equivalent to the outer diameter of the attached damaged tube portion, and sized appropriately for securing the top of the stub tube 40, shown in FIG. 5A, in the header penetration, such as by press fitting or roll expanding. The severed piece is then withdrawn from the header through the access window 31.

Alternatively, the attachment damage may be removed by machining. In this embodiment, an EDM assembly 52, shown in FIG. 2F, with a flat bottom electrode is mounted on the base plate 50. Next, the electrode is extended therefrom into the header 11 and the assembly is activated. The electrode generates a flat bottom, cylindrical depression inside the lower header wall centered axially immediately over the attachment damage location. The depression provides a suitable surface for subsequent machining steps. The diameter of the depression may be at least equivalent to the outer diameter of the tube, and sized appropriately for securing the top of the stub tube in the header penetration, such as by press fitting or roll expanding.

Next, the EDM assembly is removed from the base plate and a two piece mandrel is inserted into the tube with the attachment damage. FIG. 4B illustrates the primary mandrel 56 and mandrel extension 57. The mandrel captures and secures the damaged tube to prevent movement, and creates a centering device for subsequent cutting operations. First, the primary mandrel 56 is inserted through the header and into the tube. The end of the primary mandrel inserted into the damaged tube includes grippers 58 and a retainer ring 59. FIG. 4C illustrates the mandrel grippers 58 and retainer ring 59. A tighten-up draw bar expands to secure the grippers within the tube section to prevent movement of the tube. A mandrel extension 57 is then attached to the primary mandrel 56 and extends out of the header through the access window.

Figure 4E:
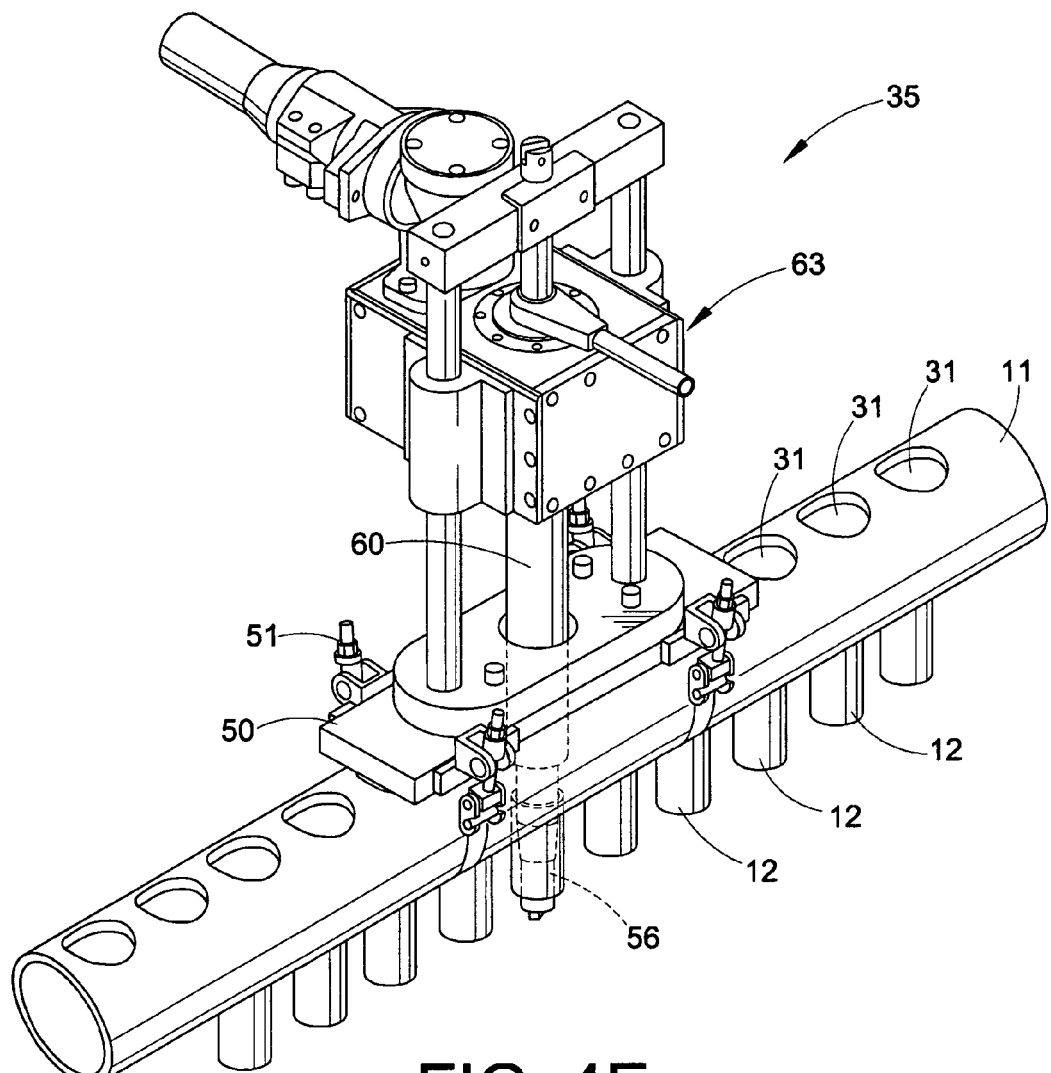
FIG. 4E is a schematic illustration of a cutting assembly.

After securing the tube with the mandrel, a hollow cutter shaft 60 with a cutter tool holder 61 and tooling is slid over the mandrel. FIG. 4D illustrates the cutter shaft 60 and cutter tool holder 61. A cutting assembly 35 is then mounted to the base plate 11. FIG. 4E illustrates the cutting assembly 35. Next, the cutter shaft 60 is attached to the cutting assembly drive 63. The shaft is then manually lowered into place, to within approximately ⅛" of the bottom of the flat bottomed depression.

The cutting assembly 35, shown in FIG. 4E, is activated and the cutting tool is lowered until it contacts the flat bottom depression. At this point, the plunge machine process begins and continues until the header is penetrated and the tube is machined to a sufficient depth below the header, thereby removing the attachment damage. Depending on the location of the damage, the tube may be machined, as in one embodiment about 1 inch to about 4 inches, below the header outer diameter to facilitate installation of the new stub tube. The mandrel, in place, may capture the severed tube.

Next, the cutting tool is replaced with an end-prep tool and the tube is then prepped for welding. After prepping the tube, the cutter assembly and the mandrel extension are removed to allow for the insertion of the new stub tube.

Figure 5A:
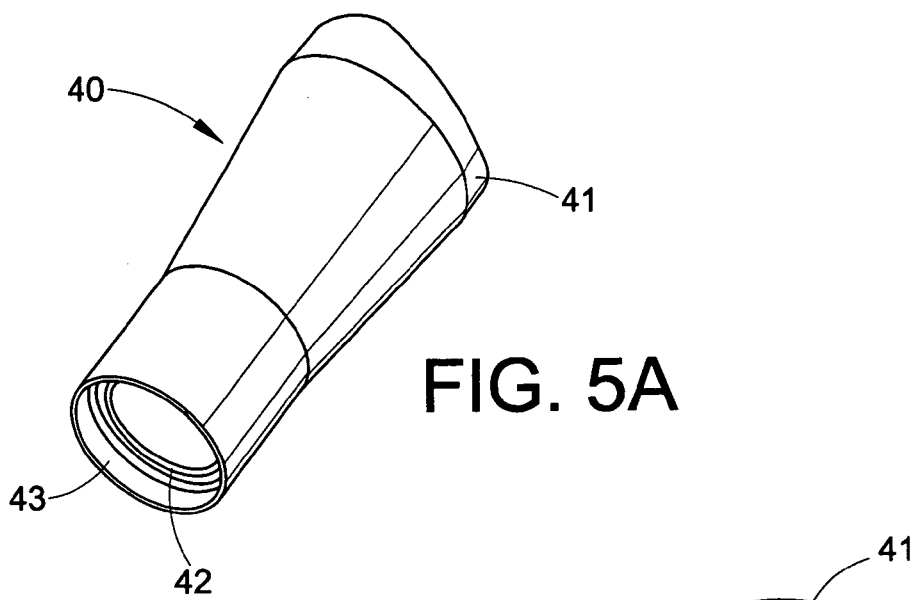
FIG. 5A is an elevational view of a tapered stub tube.
Figure 5B:
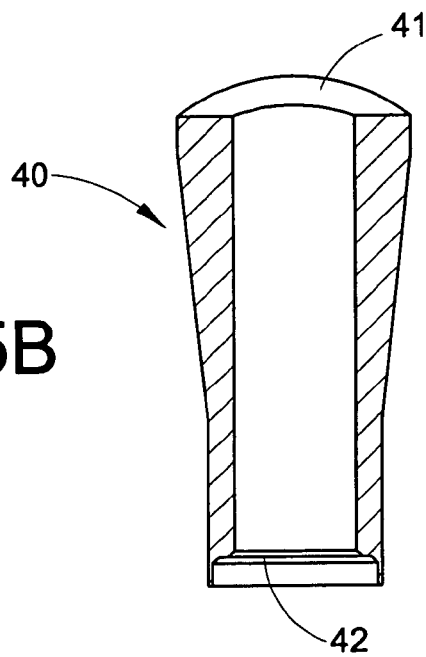
FIG. 5B is a cross-sectional view of a tapered stub tube.

The stub tube 40 is tapered so that the top of the stub tube 41 fits snuggly within the header penetration above the tube. FIG. 5A and FIG. 5B illustrate the joint stub tube 40. This allows the stub tube to be secured in position in the header penetration, such as by press fitting or roll expanding. The top of the stub tube may be fabricated to match the contour of the inside diameter of the header 11, shown in FIG. 7A. The bottom of the stub tube has a diameter slightly greater than the existing tube 12, and provides backing 42 for the stub tube to tube welding operation. Additionally, it may optionally include a transition, or sleeve 43 on its end that allows the stub tube section to slip over the existing tube, thereby guaranteeing alignment for the welding step.

Figure 6A:
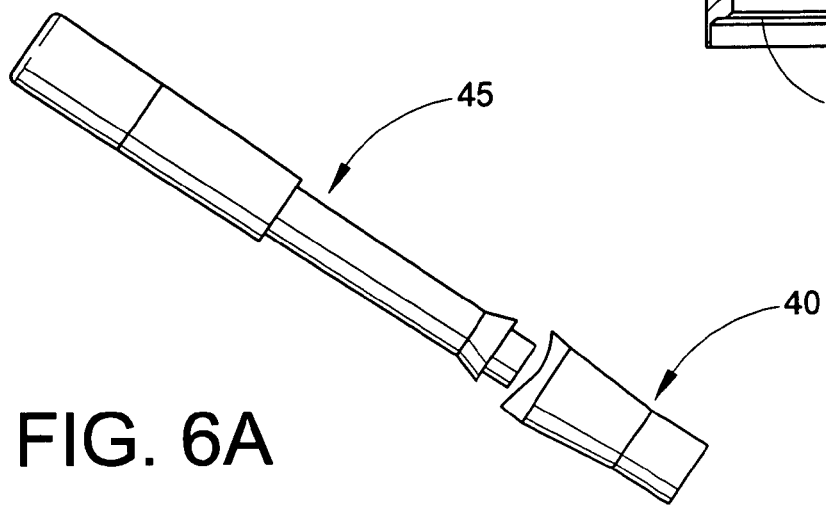
FIG. 6A is a schematic view of a stub tube insertion tool and the stub tube.

The first step to insert the stub tube is slipping the stub tube 40 and an insertion tool 45 over the primary mandrel 56. FIG. 6A is a schematic view of a stub tube 40 and insertion tool 45. The insertion tool 45 rigidly secures the stub tube 40 as it is slipped over the mandrel 56. The insertion tool 45 also automatically rotates the contoured stub tube to meet the contour of the inside diameter of the header 11, shown in FIG. 7A, thereby assuring proper alignment. In one embodiment, a press fixture is mounted to the base plate 50 and the insertion tool is attached to a lever on the fixture. The stub tube 40 is then press fit into place in the header 11 penetration. As the stub tube 40 is press fit into the header 11, the opposite end secures the existing tube in place. As a result, the bottom of the stub tube 42 is also positioned for stub tube-to-tube welding. Alternatively, the stub tube may be roll expanded to secure it in the header penetration.

Next, the header penetration and the top of the stub tube 41 may be prepared for welding. The EDM assembly 52 with a profiled electrode is mounted on the base plate 50. The EDM chamfers the header penetration and upper stub tube surface 41 in preparation for welding. The EDM assembly is then removed from the base plate.

Following chamfering, either weld may be performed. However, it is preferred to perform the header to stub tube (HST) weld first. Depending on the material of construction, preheating may be required before welding. For example, P/T91 material commonly used for HSRG configurations requires preheating to 400° F. Preheating is accomplished by methods known in the industry.

Figure 6B:
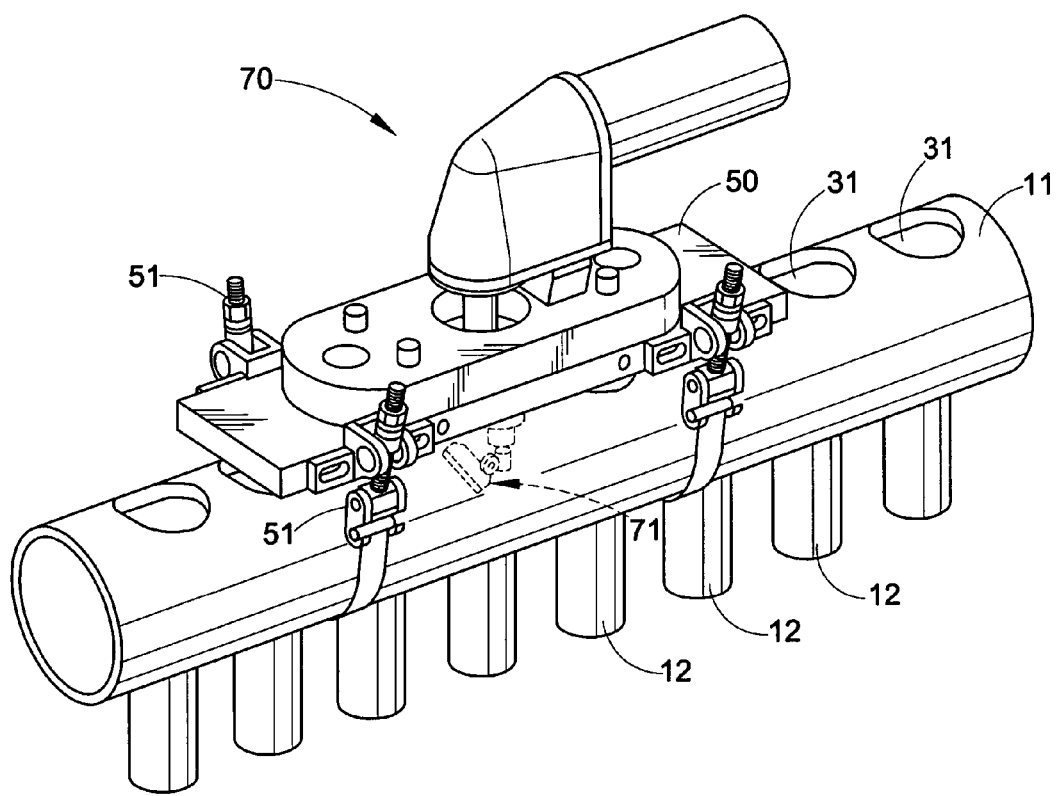
FIG. 6B is a schematic illustration of a welding assembly with a GTA profile welding head.
Figure 6C:
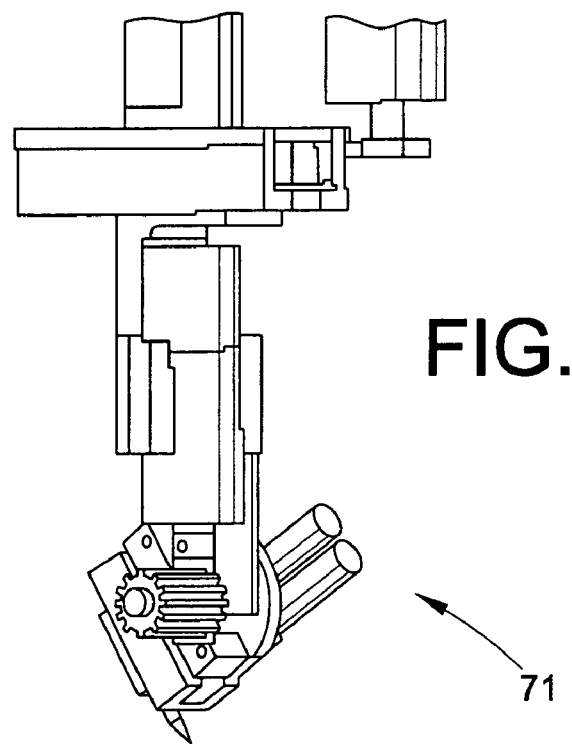
FIG. 6C is a schematic illustration of a GTA profile weld head.

The HST weld may be performed either manually or automatically. When automatic welding is used, a welding assembly 70 is mounted on the base plate 50 and a GTA profile weld head 71 is inserted in the welding assembly. FIG. 6B illustrates a welding assembly 70 with a GTA profile weld head 71 extended into the header 11. The GTA profile weld head 71 shown in FIG. 6C, allows for X, Y and Z axes of motion. This is necessary due to the contour of the stub tube and header. The welding device is then extended therefrom into the header to perform the profile weld of the stub tube to header.

Figure 6D:
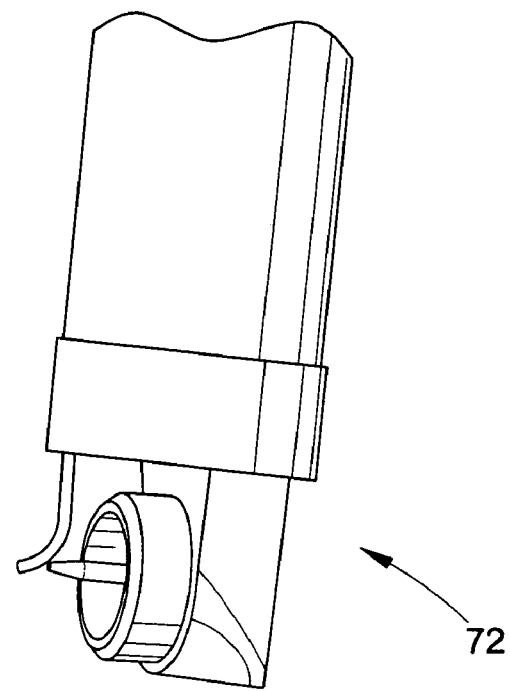
FIG. 6D is a schematic illustration of a GTA rotary axis weld head.
Figure 7A:
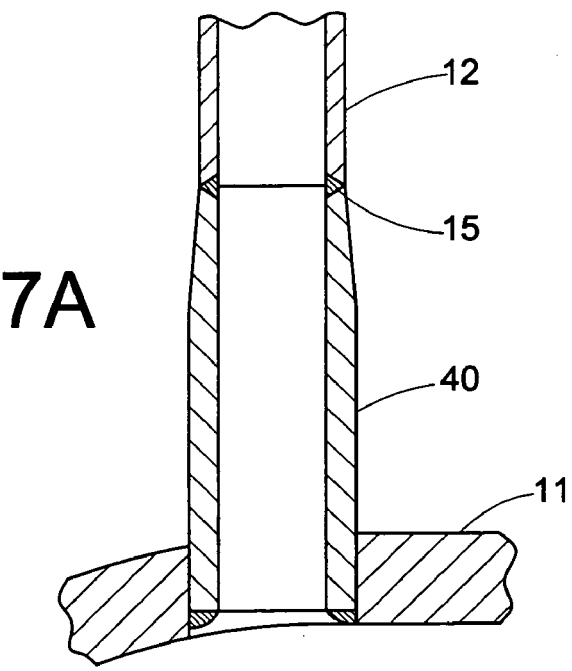
FIG. 7A is a schematic illustration of the tapered stub tube attachment to a header in cross-section.
Figure 7B:
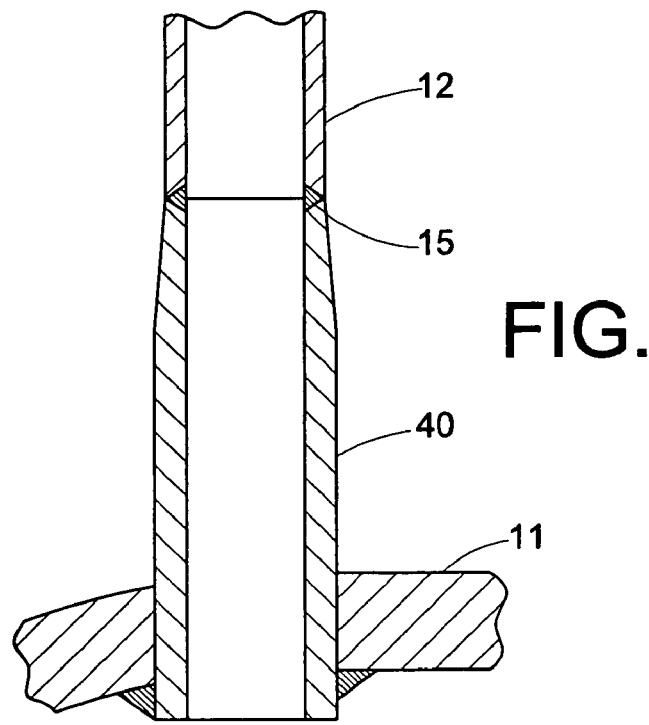
FIG. 7B is a schematic illustration of another embodiment of the tapered stub tube attachment to a header.

Next, the welding device is withdrawn from the header and the weld held is replaced with a different welding device to perform the stub tube-to-tube weld. FIGS. 7A and 7B illustrate the stub tube 40 to header 11 and stub tube-to-tube 12 attachments. This is accomplished by inserting an internal welding device, such as a device for gas tungsten arc welding (GTAW), gas metal arc welding (GMAW), laser welding, or plasma transferred arc welding (PTAW), and welding the tube from the inside. In one embodiment, a rotary axis GTA weld head 72, shown in FIG. 6D, is used to perform the stub tube-to-tube weld. After attaching, the welding device is extended therefrom through the header 11 and inside the stub tube 40 to the abutment of the stub tube and existing tube 15. A height indicator enables the user to determine vertical position of the weld head to properly position it for welding. The height indicator also allows for incremental changes for multi-pass welding. Finally, the stub tube 40 to existing tube 12 weld is performed 15.

After completing the stub tube to tube weld, the access window 31 must be welded shut. It is preferable to use the original plug. However, another suitable piece may be substituted. If the original plug is used, it is necessary to build up the plug due to any losses attributable to the EDM process. It may be welded using a B9-type filler and the GTAW process. The buildup should be sufficient so that a 30 degree weld prep can be machined around its diameter to match the 30 degree weld prep used for the access hole. The latter weld prep could be performed before removal of the weld base plate by simply reinserting the tooling device. Once the two weld preps have been completed, the plug can be reinserted into the header by tack welding the plug into place, preheating the header, and completing the final weld to secure the plug back in place.

The present method is adapted for heat recovery steam generator (HRSG) attachment repairs. However, the method may be employed to address other situations such as shell and tube heat exchangers, nozzle penetrations in steam drums, and the like, such as those used in the paper and pulp, chemical and petroleum industries.

Figure 8:
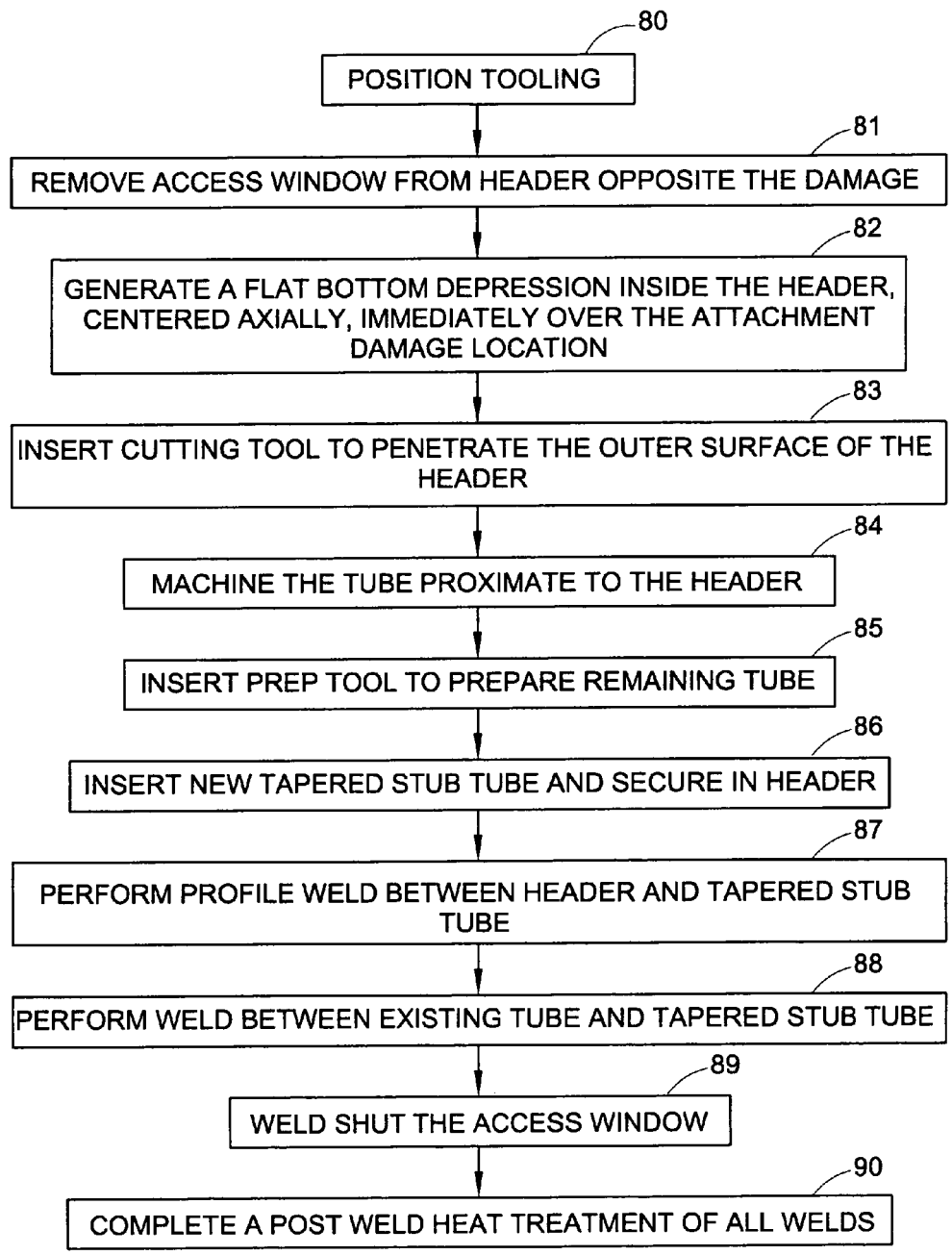
FIG. 8 is a flow chart of the procedure for carrying out an embodiment of the method.

The individual actions with respect to one embodiment of the method for repairing header to tube attachment damage are outlined in the flow chart of FIG. 8, and are set out below.

80 Position tooling.
81 Remove access window from header opposite the damage.
82 Generate a flat bottom depression inside the header, centered axially, immediately over the attachment damage location.
83 Insert cutting tool to penetrate the outer surface of the header.
84 Machine the tube proximate to the header.
85 Insert prep tool to prepare remaining tube.
86 Insert new tapered stub tube and secure in header.
87 Perform profile weld between header and tapered stub tube.
88 Perform weld between existing tube and tapered stub tube.
89 Weld shut the access window.
90 Complete a post weld heat treatment of all welds.

It will be understood that the embodiments described herein are merely exemplary and that a person skilled in the art may make many variations and modifications without departing from the spirit and scope of the invention. All such modifications and variations are intended to be included within the scope of the invention as described herein. It should be understood that the embodiments described above are not only in the alternative, but can be combined.

We claim:

1. A method for repairing header to tube attachment damage, comprising:
   providing an access window in a header opposite the attachment damage location;
   removing the attachment damage;
   inserting a tapered stub tube into a header penetration centered axially immediately over the tube;
   effecting a profile weld between the header and the tapered stub tube at the header penetration from the inside surface of the header;
   welding the tapered stub tube to the existing tube through the header inside diameter;
   welding shut the header access window; and
   completing a post weld heat treatment of all welds;
   wherein said providing an access window in the header opposite the damaged header to tube attachment location comprises:
      mounting a-base plate to the header to position tooling, about 180 degrees away and centered axially along the header from the header to tube attachment damage location;
      mounting an EDM assembly to the base plate;
      removing a plug from the header, about 180 degrees from the attachment damage location, that is greater in diameter than the stub tube; and
      realigning the base plate with a centering alignment plug and centering ring.

2. The method of claim 1 wherein said removing the attachment damage comprises:
   mounting the EDM assembly with a flat bottom electrode to the base plate;
   generating a flat bottom depression inside the header, centered axially about immediately over the attachment damage location, the depression having a diameter at least equivalent to the tube outer diameter;
   removing the EDM assembly;
   inserting a mandrel into the tube;
   securing said damaged tube with said mandrel;
   mounting a cutting assembly with a cutting tool to the base plate over the mandrel;
   plunging the cutting tool to penetrate the outer surface of the header; and
   machining the tube proximate the header.

3. The method of claim 1 wherein said effecting a profile weld comprises:
   mounting a welding assembly to the base plate;
   extending a welding device from the welding assembly inside the header; and
   performing a profile weld of the header to stub tube at the inside surface of the header.

4. The method of claim 3 wherein the welding device is a GTA profile weld head.

5. The method of claim 3 wherein said welding the tapered stub tube to the existing tube comprises:
   extending the welding device with an ID weld head through the header to the stub tube and tube abutment; and
   performing the stub tube-to-tube weld.

6. The method of claim 1 wherein said removing the attachment damage comprises:
   mounting a cutting assembly to the base plate;
   extending a cutting tool from the culling assembly through the header and into the tube beyond the attachment damage location;
   cutting the tube;
   mounting an EDM assembly to the base plate;
   extending the EDM assembly electrode into the header;
   boring a header penetration with a diameter at least equivalent to the damaged tube outer diameter, thereby severing the damaged tube and weld; and
   withdrawing the severed tube through the inner diameter of the header.

7. The method of claim 1, including preparing said tube for welding with a cutting assembly having a cutting tool prior to inserting the tapered stub tube into the header penetration; optionally wherein said preparing the tube for welding comprises:
   replacing the culling tool with an end-prep tool;
   positioning the end-prep tool; and
   chamfering the end of said prepared tube.

8. The method of claim 1, including preparing the header and stub tube for welding prior to effecting a profile weld; optionally wherein said preparing the header and stub tube for welding comprises:
   mounting the EDM assembly with a profiled electrode to the base plate; and
   chamfering the header and top of the stub tube.

9. A method for repairing header to tube attachment damage, comprising:
   providing an access window in a header opposite the attachment damage location;
   removing the attachment damage;
   inserting a tapered stub tube into a header penetration centered axially immediately over the tube;
   effecting a profile weld between the header and the tapered stub tube at the header penetration from the inside surface of the header;
   welding the tapered stub tube to the existing tube through the header inside diameter;
   welding shut the header access window; and
   completing a post weld heat treatment of all welds;
   wherein said inserting the tapered stub tube into the header penetration comprises:
      removing a cutting assembly from a base plate mounted to the header;
      slipping the stub tube and an insertion tool over a primary mandrel inserted into the tube;
      aligning the stub tube contour with the header contour; and
      securing the stub tube in the header.

10. The method of claim 9 wherein the stub tube is secured by press fitting or roll expanding.

11. The method of claim 9 wherein said removing the culling assembly comprises:
    detaching a mandrel extension from a primary mandrel;
    detaching a cutter shaft from the culling assembly;
    removing the culling assembly from the base plate; and
    removing the cutter shaft from the primary mandrel.

12. The method of claim 9, including preparing said tube for welding with a cutting assembly having a cutting tool prior to inserting the tapered stub tube into the header penetration; optionally wherein said preparing the tube for welding comprises:
    replacing the culling tool with an end-prep tool;
    positioning the end-prep tool; and
    chamfering the end of said prepared tube.

13. The method of claim 9, including preparing the header and stub tube for welding prior to effecting a profile weld; optionally wherein said preparing the header and stub tube for welding comprises:
    mounting an EDM assembly with a profiled electrode to the base plate; and
    chamfering the header and top of the stub tube.

* * * * *